(12) United States Patent
Piramuthu et al.

(10) Patent No.: US 10,771,685 B2
(45) Date of Patent: Sep. 8, 2020

(54) AUTOMATIC GUIDED CAPTURING AND PRESENTATION OF IMAGES

(71) Applicant: eBay Inc., San Jose, CA (US)

(72) Inventors: Robinson Piramuthu, Oakland, CA (US); Wen Zheng, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/363,158

(22) Filed: Mar. 25, 2019

(65) Prior Publication Data

US 2019/0289199 A1 Sep. 19, 2019

Related U.S. Application Data

(63) Continuation of application No. 15/361,973, filed on Nov. 28, 2016, now Pat. No. 10,270,965.

(Continued)

(51) Int. Cl.
| | |
|---|---|
| *H04N 5/232* | (2006.01) |
| *G06Q 30/06* | (2012.01) |
| *G06T 1/00* | (2006.01) |
| *H04N 5/222* | (2006.01) |
| *H04N 5/247* | (2006.01) |
| *G06K 9/00* | (2006.01) |
| *G06K 9/20* | (2006.01) |

(Continued)

(52) U.S. Cl.
CPC .......... *H04N 5/23222* (2013.01); *G06K 9/00* (2013.01); *G06K 9/00201* (2013.01); *G06K 9/00671* (2013.01); *G06K 9/2081* (2013.01); *G06K 9/38* (2013.01); *G06Q 30/0643* (2013.01); *G06T 1/0007* (2013.01); *G06T 11/60* (2013.01); *H04N 5/2226* (2013.01); *H04N 5/23293* (2013.01); *H04N 5/247* (2013.01)

(58) Field of Classification Search
None
See application file for complete search history.

(56) References Cited

U.S. PATENT DOCUMENTS

| 5,923,380 A | 7/1999 | Yang et al. |
|---|---|---|
| 5,978,519 A | 11/1999 | Bollman et al. |

(Continued)

FOREIGN PATENT DOCUMENTS

| CN | 108292425 A | 7/2018 |
|---|---|---|
| WO | 2013/063299 A1 | 5/2013 |

(Continued)

OTHER PUBLICATIONS

Xue Bai & Guillermo Sapiro, "A Geodesic Framework for Fast Interactive Image and Video Segmentation and Matting", 2007; IEEE, 978-1-4244-1631-8/07 (Year: 2007).*

(Continued)

*Primary Examiner* — Cynthia Segura
(74) *Attorney, Agent, or Firm* — Mintz Levin Cohn Ferris Glovsky and Popeo, P.C.

(57) ABSTRACT

Disclosed are embodiments for facilitating automatic-guided image capturing and presentation. In some embodiments, the method includes capturing an image of an item, removing a background of the image frame, performing manual mask editing, generating an item listing based on the manually edited mask, inferring item information from the image frame and applying the inferred item information to an item listing.

17 Claims, 7 Drawing Sheets

Related U.S. Application Data

(60) Provisional application No. 62/263,433, filed on Dec. 4, 2015.

(51) Int. Cl.
*G06K 9/38* (2006.01)
*G06T 11/60* (2006.01)

(56) References Cited

U.S. PATENT DOCUMENTS

| | | | |
|---|---|---|---|
| 8,358,691 B1 * | 1/2013 | Wang | G06T 7/20 375/240.02 |
| 9,547,799 B2 | 1/2017 | Chen et al. | |
| 9,807,316 B2 | 10/2017 | Jen et al. | |
| 10,270,965 B2 | 4/2019 | Piramuthu et al. | |
| 2004/0100572 A1 | 5/2004 | Kim | |
| 2008/0082426 A1 | 4/2008 | Gokturk et al. | |
| 2009/0248742 A1 * | 10/2009 | Krishnamurthy | G06Q 30/0621 |
| 2009/0290795 A1 * | 11/2009 | Criminisi | G06T 7/155 382/173 |
| 2011/0038536 A1 * | 2/2011 | Gong | G06T 7/11 382/164 |
| 2011/0264549 A1 | 10/2011 | Lewis et al. | |
| 2012/0327172 A1 * | 12/2012 | El-Saban | G06K 9/00228 348/14.02 |
| 2013/0038759 A1 | 2/2013 | Jo et al. | |
| 2013/0121593 A1 * | 5/2013 | Wang | G06K 9/6207 382/199 |
| 2013/0258117 A1 * | 10/2013 | Penov | G06K 9/6202 348/207.1 |
| 2013/0336523 A1 | 12/2013 | Ruan | |
| 2014/0226052 A1 | 8/2014 | Kang et al. | |
| 2015/0098648 A1 | 4/2015 | Ishii | |
| 2015/0110391 A1 * | 4/2015 | Zhou | G06T 7/194 382/164 |
| 2015/0110392 A1 * | 4/2015 | Wang | G06T 7/194 382/164 |
| 2015/0235374 A1 * | 8/2015 | Wang | G06T 7/11 382/160 |
| 2015/0254855 A1 | 9/2015 | Patankar et al. | |
| 2015/0254868 A1 | 9/2015 | Srikanth et al. | |
| 2016/0217328 A1 | 7/2016 | Yanai et al. | |
| 2016/0335789 A1 * | 11/2016 | Zhang | G06T 7/194 |
| 2017/0083762 A1 | 3/2017 | Segalovitz et al. | |
| 2017/0111574 A1 | 4/2017 | Miyashita | |
| 2017/0163882 A1 | 6/2017 | Piramuthu et al. | |
| 2017/0223261 A1 | 8/2017 | Shimizu et al. | |
| 2019/0005649 A1 * | 1/2019 | Gering | G06T 7/12 |

FOREIGN PATENT DOCUMENTS

| | | |
|---|---|---|
| WO | 2015/044947 A1 | 4/2015 |
| WO | 2017/095834 A1 | 6/2017 |

OTHER PUBLICATIONS

Applicant Initiated Interview Summary received for U.S. Appl. No. 15/361,973, dated Jul. 30, 2018, 2 pages.
First Action Interview—Office Action Summary received for U.S. Appl. No. 15/361,973, dated Jul. 30, 2018, 5 pages.
First Action Interview Pilot Program Pre-Interview Communication received for U.S. Appl. No. 15/361,973 dated May 14, 2018, 5 pages.
Notice of Allowance received for U.S. Appl. No. 15/361,973, dated Dec. 10, 2018, 11 pages.
PTO Response to Rule 312 Communication received for U.S. Appl. No. 15/361,973, dated Feb. 25, 2019, 2 pages.
Response to First Action Interview—Office Action Summary filed on Oct. 30, 2018, for U.S. Appl. No. 15/361,973, dated Jul. 30, 2018, 15 pages.
Response to First Action Interview—Pre-Interview Communication filed on Jun. 14, 2018 for U.S. Appl. No. 15/361,973, dated May 14, 2018, 6 pages.
International Preliminary Report on Patentability received for PCT Application No. PCT/US2016/064057, dated Jun. 14, 2018, 7 pages.
International Search Report received for PCT Application No. PCT/US2016/064057 dated Mar. 9, 2017, 4 pages.
International Written Opinion received for PCT Application No. PCT/US2016/064057 dated Mar. 9, 2017, 5 pages.

* cited by examiner

AUTOMATIC GUIDED CAPTURING AND PRESENTATION OF IMAGES

PRIORITY

This patent application is a continuation of and claims priority to U.S. Utility patent application Ser. No. 15/361,973, filed Nov. 28, 2016, and entitled "Automatic Guided Capturing and Presentation of images," which claims the benefit of priority to U.S. Provisional Patent Application Ser. No. 62/263,433, filed Dec. 4, 2015. The contents of these prior applications are considered part of this application, and are hereby incorporated by reference in their entirety.

BRIEF DESCRIPTION OF THE DRAWINGS

Some embodiments are illustrated by way of example and not limitation in the figures of the accompanying drawings.

DETAILED DESCRIPTION

Figure 1:
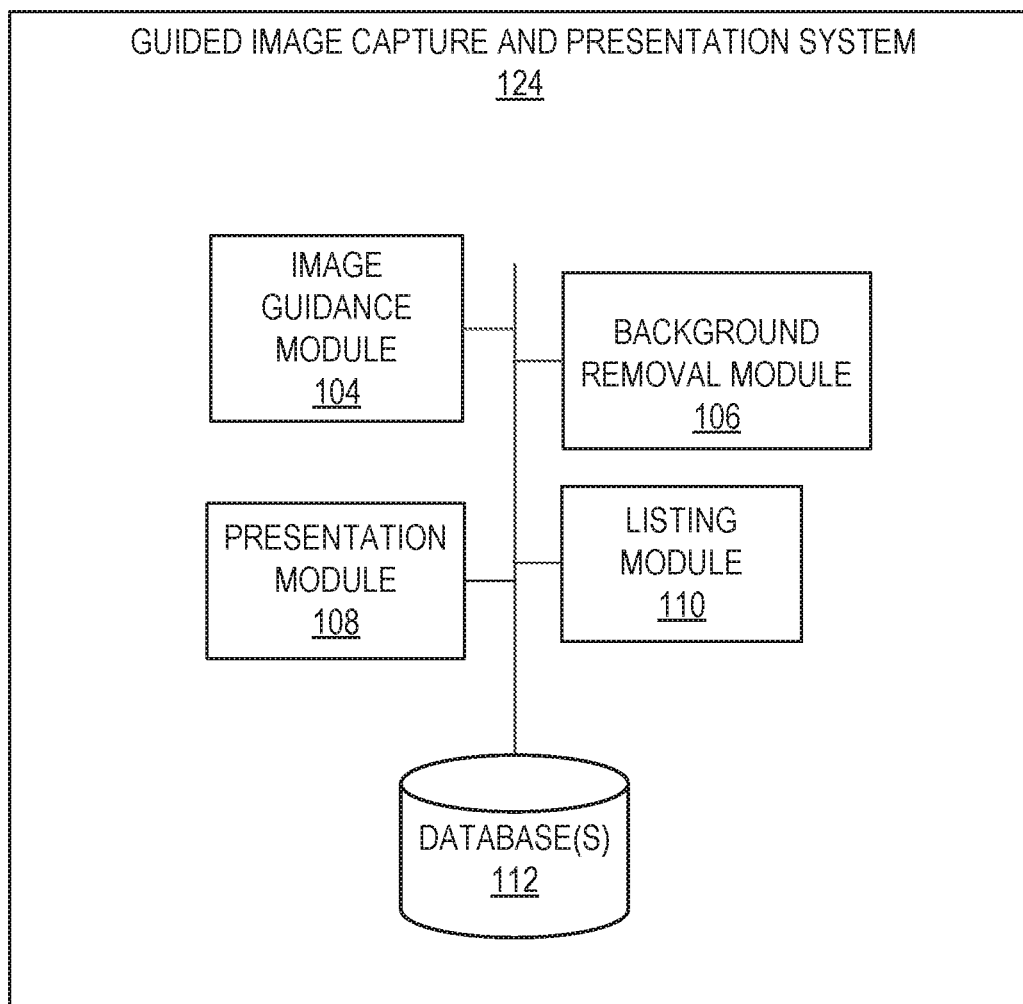
FIG. 1 is a block diagram illustrating functional components of the guided image capture in presentation system, according to some example embodiments.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

Example embodiments described herein facilitate automatic-guided image capturing and presentation of item listings (e.g., item data records). Mobile device logic may execute the automatic-guided image capturing and presentation, independent of a network connection, allowing for enhanced creation of item listings and increased efficiency of network resources. Embodiments facilitate image guidance, automatic background removal, automatic completion of item listing forms, and online store management.

In example embodiments, a user of a mobile device (e.g., a seller) may use the mobile device to automatically create an item listing. A guided image capture and presentation system on a mobile device guides the user in capturing an image of an item with the camera of the mobile device, detects and automatically removes the background portion of the image, keeping only the portion of the image comprising the item of interest, and allows the user to further modify the image by manually altering the background portion of the image.

In additional example embodiments, the guided image capture presentation system facilitates automatic completion of item listing forms by inferring information from the captured image (e.g., category recognition, characteristic recognition such as color, pattern, and style). Automatic completion of item listing forms may also include inferring from a captured image of the item certain keywords associated with the item and title predictions. Multiple images may also be used by the system in automatic completion of item listings. Automatic completion of item listings may also include displaying to the user a list of items that potentially have similar title and/or price, assisting the user in constructing the title of the item listing and the price of the item. The guided image capture and presentation system may also allow the user to showcase the item from the item listing in an augmented reality environment, including a presentation layer for presenting the item on a virtual shelf or clothing rack to be viewed by potential buyers visiting the user's online store. Based on information inferred from the captured image, the guided image capture and presentation system may automatically choose a presentation layer in accordance with the category and/or characteristics of item (e.g., a virtual shelf to display shoes, a virtual rack to display clothing). The user of the mobile device may also manually choose a presentation layer for the item. Furthermore, the augmented reality environment may allow for customization of the presentation layer by the user (e.g., allowing the user to choose a style of virtual shelf, clothing rack, or wallpaper based on the user's preference or target audience).

FIG. 1 is a block diagram illustrating functional components of a guided image capture and presentation system (GIPS) 124, according to some example embodiments. The 124 facilitates automatic-guided image capturing and presentation of item listings, as described above. Various functional modules are shown for the GIPS 124, which is provided as part of a network system, as described in more detail with respect to FIG. 6. As is understood by skilled artisans in the relevant computer and Internet-related arts, each component (e.g., a module or engine) illustrated in FIG. 1 may be implemented using hardware (e.g., a processor of a machine) or a combination of logic (e.g., executable software instructions) and hardware memory and processor of a machine) for executing the logic.

The GIPS 124 is shown as including an image guidance module 104, a background removal module 106, a presentation module 108, a listing module 210, and database 112, all configured to communicate with each other (e.g., via a bus, shared memory, a switch, or application programming interfaces (APIs)). The various modules of the GIPS 124 may, furthermore, access the database 122 via database servers, and each of the various modules of the GIPS 124 may be in communication with one or more third party applications, for example a social network platform. While the modules of FIG. 1 are discussed in the singular sense, it will be appreciated that in other embodiments multiple modules may be employed.

The image guidance module 104 assists a user of a mobile device in capturing an image of an item for an item listing. For example, the image guidance module 104 guides the user to position the mobile device in an optimal direction from the item, detects the item through a camera of the mobile device and captures one or more image frames of the item. The image guidance module 104 estimates a background portion of the image and a foreground portion of the image for each captured image frame. For example, estimation of the background and foreground portions of the image may be accomplished by identifying a first region and a second region and determining that at least one area within the first region comprises a grouping of pixels that are different (e.g., different in color) from a grouping of pixels in the second region, or vice versa. In identifying the areas of differing groups of pixels, the image guidance module 104 estimates that the first region or second region comprises the item of interest. Additionally to estimating the location (e.g., location within the first region or second region) of the item of interest, the image guidance module 104 communicates instructions to the user of the mobile device for capturing an image of the item. In some embodiments, a user interface of the mobile device displays a viewfinder (e.g., a shape superimposed upon the user interface of the mobile device) for guiding the positioning of the item for image capturing.

As the user holds the mobile device at a distance from the object and moves the mobile device, the image guidance module 104 may display human-readable instructions (e.g., textual instructions) within the user interface instructing the user to move the mobile device such that the item will become completely included within a boundary of the viewfinder. For example, an inner boundary of the viewfinder may correspond to the aforementioned first region (e.g., foreground) and an outer boundary may correspond to the aforementioned second region (e.g., background). In other embodiments, instead of instructing the user to move the mobile device, the image guidance module 104 displays instructions instructing the user to increase or decrease lighting or to relocate objects, for example removing objects from the background portion of the image or separating two objects within the foreground portion of the image (e.g., the item of interest being proximate to another object). In some embodiments, guided image capturing processes each captured image frame and instructs the user of the mobile device in real-time. A captured image may be stored on the mobile device, for example, within a database (e.g., database 112) or a location within memory and may also be stored on a remote network-based system within a database or memory, for example, a network-based system similar to that described with respect to FIG. 6.

The background removal module 106 automatically removes the background portion of an image, leaving only the portion of the image comprising the item of interest. Similar to the guided image capturing described above, background removal may be performed in real-time on the mobile device. Additionally, the background module 106 may also automatically remove the background portion of an image frame or a group of image frames. In some embodiments, the background removal module 106 accesses a captured image frame of an item and detects a boundary of the item within the image, separating the item from the image background. In detecting the boundary of the item, the background removal module 106 makes an initial estimate of a binary mask, the binary mask comprising a first region and a second region of the image, for example the aforementioned first region and second region with respect to the image guidance module 104. For both the first region and the second region, the background removal module 106 computes a color histogram and computes a probability per pixel using the color histogram, in computing the probability per pixel, the background removal module 106 creates a probability map. The background removal module 106 may smooth the probability map by using domain transform geodesic filtering and obtaining a binary mask using a threshold selection method. The threshold selection method assigns pixels having a value (e.g., a RGB value) above a determined threshold value to one binary value and pixels having a value below the determined threshold value to another binary value.

The background removal module 106 may also perform manual editing of an image by receiving a user input on the mobile device. In some embodiments, a binary mask of an image is created and the user of the mobile device manually edits the binary mask by creating a scribble, further defining the outline of the item of interest and further separating the background portion of the image from the item of interest. A scribble is defined as a certain type of user input created by the user bringing an object within a predefined proximity to the user interface of the mobile device (e.g., touching the screen of the mobile device with a finger), causing a portion of the user interface (e.g., representing the image) to be highlighted or otherwise differentiated from the remaining portion of the image. After receiving a user input scribble, the background removal module 106 uses domain transform geodesic filtering to smooth the scribble. The background removal module 106 scales the smoothed scribble to a value above or below a threshold value. For example, the smoothed scribble may be scaled to a value above or below a determined threshold value corresponding to the threshold value used in creating the binary mask using the threshold selection method described above with respect to automatic background removal. The scaled scribble is added or subtracted from the probability map created during automatic background removal, depending on the value of the scribble being above or below the determined threshold value, obtaining a binary mask from the probability map. The background removal module 106 may also cause the scribble to shrink or grow in size covering portions of the background to be removed. Additionally, the background removal module 106 may also allow the scribble to snap to a detected boundary of the item of interest within the image. In some embodiments the binary mask obtained after the scaling of the scribble is unique from the binary mask created during automatic background removal.

The listing module 110 automatically fills item listing forms to create an item listing. For example, the automatic item form listing is accomplished by inferring information from an image of an item (e.g., characteristics of an item including color, style, category, brand name). In some embodiments, information regarding the item is inferred from the image or image frames captured during the guided image capturing described above with respect to the image guidance module 104. In automatically completing item listing forms, the listing module 110 also includes displaying to the user a list of items that potentially have similar title and/or price, assisting the user in constructing the title of the item listing and the price of the item. When an item listing form is completed, the item listing is created, including the image of the item, information inferred from the image regarding the item, and any additional input information received from the user of the mobile device. The guided image capture and presentation system 124 uses a completed item listing to display the item within an augmented reality environment of a seller's online store.

The presentation module 108 causes items (e.g., a captured image of the item as described above) to be presented in an augmented reality environment including a presentation layer. For example, the presentation module 108 may present an item on a virtual shelf or clothing rack to be viewed by potential buyers visiting the user's online store. In some embodiments, based on information inferred from the image of the item, the listing module 110 automatically chooses a presentation layer in accordance with the category and/or characteristics of item (e.g., a virtual shoe rack to display shoes, a virtual clothing rack to display clothing, or a virtual shelf). The user of the mobile device may also manually choose a presentation layer for the item. Furthermore, the augmented reality environment allows for customization of the presentation layer by the user (e.g., allowing the user to choose a style of virtual shelf, clothing rack, or wallpaper based on the user's preference or target audience). Enhancing the augmented reality experience for a viewer of an online store (e.g., a visiting buyer or the seller), the presentation module 108 allows for the addition of a virtual sale indicator, for example, a "red sale tag." The virtual sale indicator allows a seller to draw attention from viewers of the online store toward a specific item, for example, indicating that an item within the seller's online store is being offered at a special Price. In some embodiments, when viewing the presentation layer of a seller's online store, a viewer may select a displayed item (e.g., by touching an item on a virtual shelf or clothing rack displayed on the user interface of the mobile device) and upon selecting the item the presentation module 108 links the viewer to a page displaying detailed information regarding the item.

Figure 2:
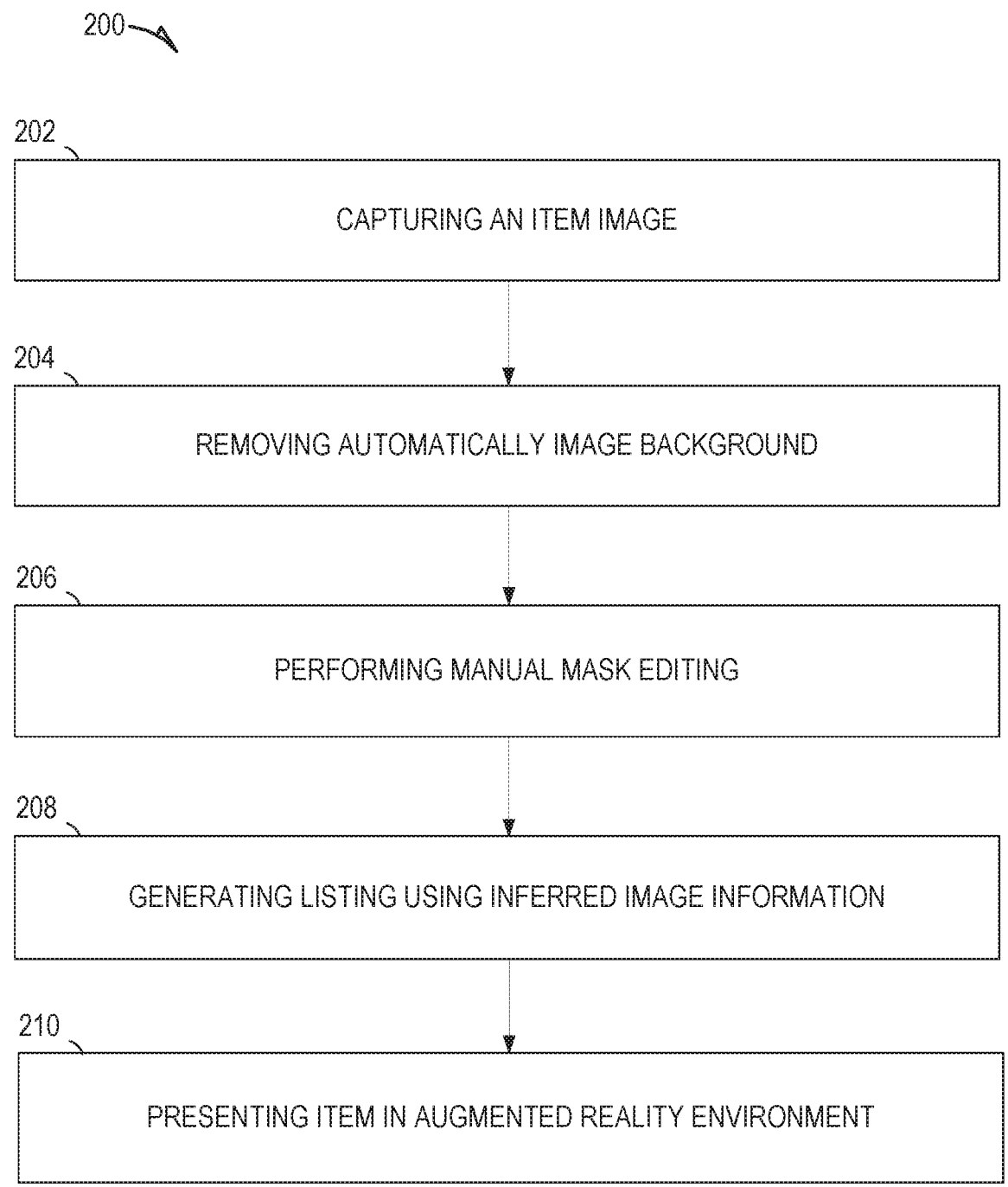
FIG. 2 is a flowchart illustrating operations of a device in performing a method for automatic-guided image capturing and presentation, according to some example embodiments.

FIG. 2 is a flowchart illustrating operations of a device in performing a method 200 for automatic guided capturing and presentation of images, according to some example embodiments. The method 200 includes capturing of an item image 202, removing automatically the image background 204, performing manual mask editing 206, generating an item listing using inferred image information 208, and presenting an item listing in an augmented reality environment 210. The method 200 may be embodied in computer-readable instructions for execution by one or more processors such that the steps of the method 200 may be performed in part or in whole by functional components (e.g., modules) of the GIPS 124; accordingly, the method 200 is described below by way of example with reference thereto. However, it shall be appreciated that the method 200 may be deployed on various other hardware configurations and is not intended to be limited to the functional components of the GIPS 124.

In operation 202, the GIPS 124 assists a user of a mobile device in capturing an image of an item for an item listing. For example, the GIPS 124 guides the user to position the mobile device in an optimal direction from the item, detects the item through a camera of the mobile device and captures one or more image frames of the item. The GIPS 124 estimates a background portion of the image and a foreground portion of the image for each captured image frame, for example, by identifying a first region and a second region and determining that at least one area within the first region comprises a grouping of pixels that are different (e.g., different in color) from a grouping of pixels in the second region, or vice versa. The GIPS 124 estimates that the first region or second region comprises the item of interest. Additionally, the GIPS 124 communicates instructions to the user of the mobile device for capturing an image of the item. As the user holds the mobile device, the GIPS 124 displays human-readable instructions (e.g., textual instructions) within the user interface instructing the user to move the mobile device such that the item will become completely included within a boundary of the viewfinder, to increase or decrease lighting or to relocate objects, for example removing objects from the background portion of the image or separating two objects within the foreground portion of the image (e.g., the item of interest being proximate to another object). When the GIPS 124 detects that the item is completely included within the boundary of the viewfinder, an image is captured.

Figure 3:
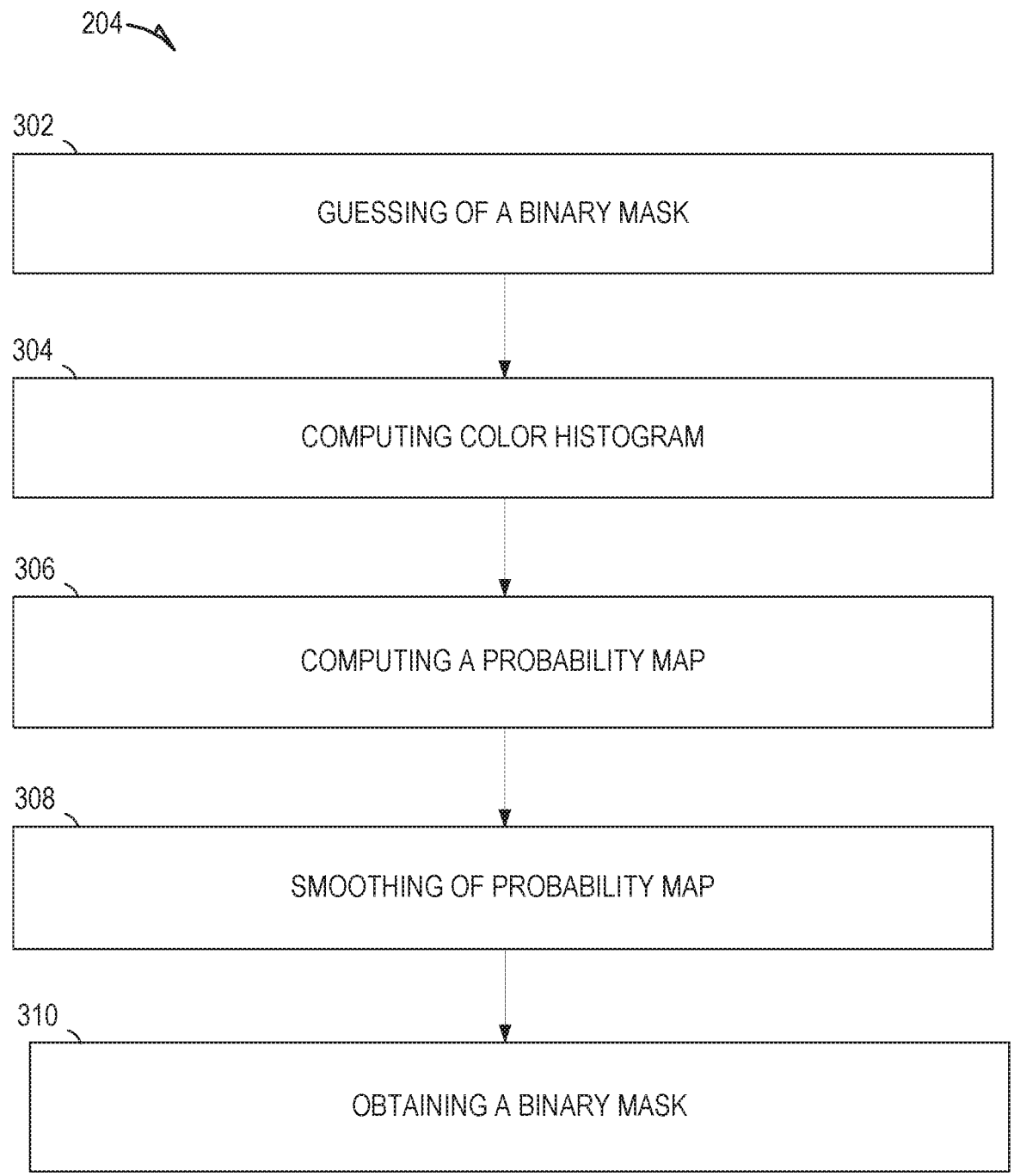
FIG. 3 is a flowchart illustrating operations of a device in performing a method for automatic-guided image capturing and presentation, according to some example embodiments.

At operation 204, the GIPS 124 automatically removes the image background. In automatically removing the image background, the GIPS 124 leaves only the portion of the image comprising the item of interest. As an example of the sub-operations involved in the operation 204, FIG. 3 is a flowchart illustrating operations of a device in performing a method for automatic-guided image capturing and presentation, according to some example embodiments. As shown, the operation of automatically removing the image background includes guessing of a binary mask 302, computing a color histogram 304, computing a probability map 306, smoothing of the probability map 308, and obtaining a binary mask 310. In operation 302, the GIPS 124 makes an initial guess of a binary mask. The GIPS 124 accesses a captured image of the item and detects a boundary of the item within the image, separating the item from the image background. In detecting the boundary of the item, the GIPS 124 makes an initial estimate of a binary mask, the binary mask comprising a first region and a second region of the image. In operation 304, the GIPS 124 computes a color histogram for both the first region and the second region of the image. In operation 306, the GIPS 124 computes a probability map. The GIPS 124 computes a probability per pixel using the color histogram. In computing the probability per pixel, the GIPS 124 creates a probability map. In operation 308, the GIPS 124 smooths the probability map by using domain transform geodesic filtering. In performing domain transform geodesic filtering, the GIPS 124 assigns pixels having a value (e.g., a RGB value) above a determined threshold value to one binary value and pixels having a value below the determined threshold value to another binary value. In assigning pixels a value above or below the determined threshold value, in operation 310, the GIPS 124 obtains a binary mask.

Figure 4:
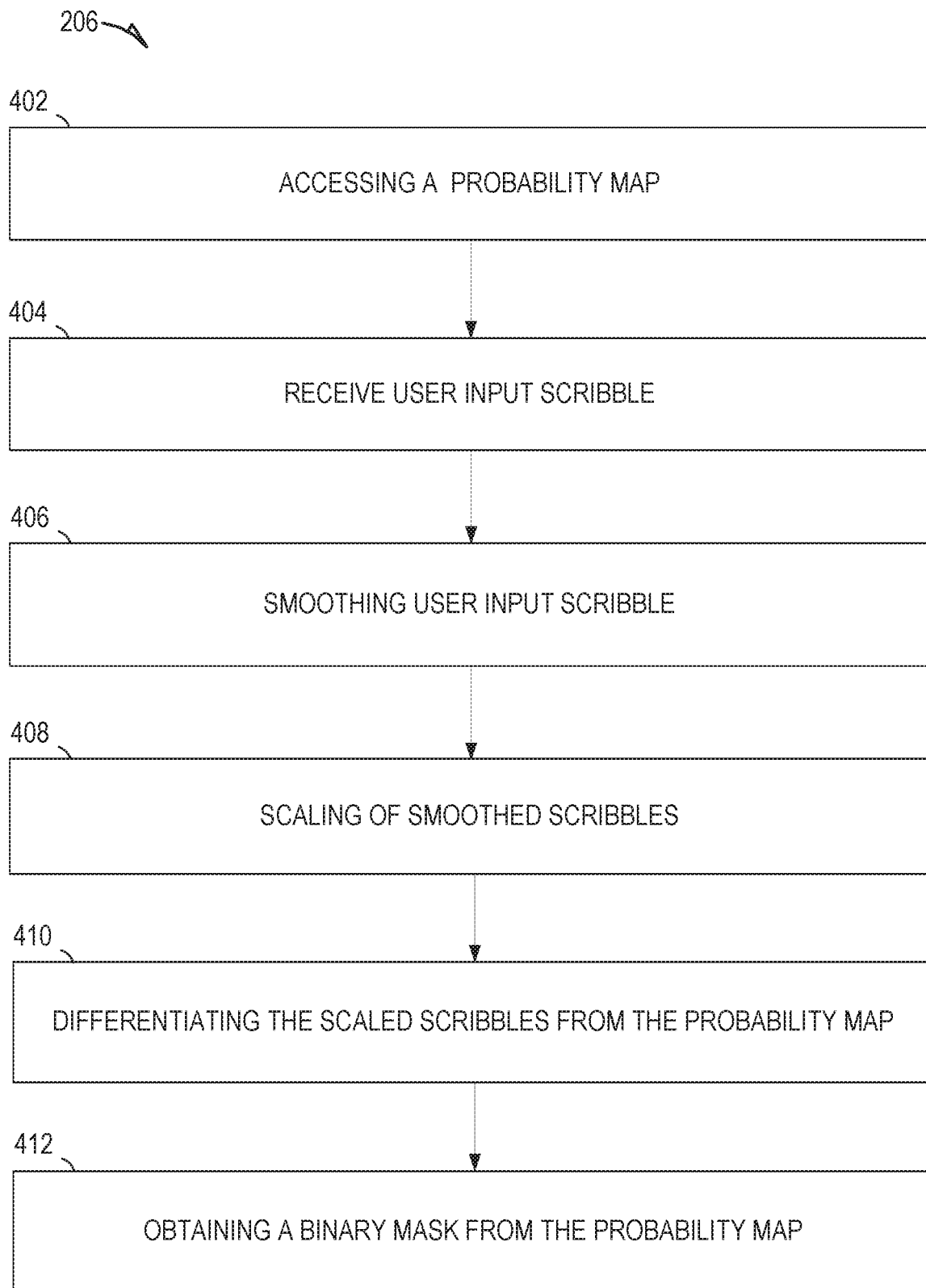
FIG. 4 is a flowchart illustrating operations of a device in performing a method for automatic-guided image capturing and presentation, according to some example embodiments.

Returning to FIG. 2, at operation 206, the GIPS 124 performs manual mask editing. As an example of the sub-operations involved in the operation 206, FIG. 4 is a flowchart illustrating operations of a device in performing a method for automatic-guided image capturing and presentation, according to some example embodiments.

In operation 402, the GIPS 124 access a probability map, for example, probability map created during automatic image background removal). In operation 404, the GIPS 124 receives a user input on the mobile device in the form of a scribble. Using the scribble, the GIPS 124 further defines the outline of the item of interest and further separates the background portion of the image from the item of interest. In operation 406, after receiving a user input scribble, the GIPS 124 uses domain transform geodesic filtering to smooth the scribble. In operation 408, the GIPS 124 scales the smoothed scribble to a value above or below the threshold value. For example, the smoothed scribble may be scaled to a value above or below a determined threshold value corresponding to the threshold value used in creating the binary mask using the threshold selection method. In operation 410, the GIPS 124 differentiates the scaled scribble from the probability map by adding or subtracting the scaled scribble value from the probability map created during automatic background removal, depending on the value of the scribble being above or below the determined threshold value. In differentiating the scaled scribble from the probability map, in operation 412, the GIPS 124 obtains a binary mask from the probability map. The GIPS 124 may cause the scribble to shrink or grow in size covering portions of the background to be removed. Additionally, the GIPS 124 may also cause the scribble to snap to a detected boundary of the item of interest within the image.

Turning back to FIG. 2, in operation 208, the GIPS 124 generates an item listing using inferred image information. The GIPS 124 automatically fills an item listing form to create an item listing, inferring information from an image of an item (e.g., characteristics of an item including color, style, category, brand name). The GIPS 124 infers information regarding the item from the image or image frames captured during the guided image capturing described above with respect to operation 202. In automatically completing item listing forms, the GIPS 124 also includes displaying to the user a list of items that potentially have similar title and/or price, assisting the user in constructing the title of the item listing and the price of the item. The GIPS 124 completes the item listing form, creating the item listing, including the image of the item, information inferred from the image regarding the item, and any additional input information received from the user of the mobile device. The GIPS 124 uses a completed item listing to display the item within an augmented reality environment of a seller's online store.

In operation 210, the GIPS 124 presents the item listing in an augmented reality environment. The GIPS 124 showcases the item (e.g., a captured image of the item as described above) from the item listing in an augmented reality environment including a presentation layer, for example, presenting the item on a virtual shelf or clothing rack to be viewed by potential buyers visiting the user's online store. In some embodiments, based on information inferred from the image of the item, the GIPS 124 automatically chooses a presentation layer in accordance with the category and/or characteristics of item (e.g., a virtual shoe rack to display shoes, a virtual clothing rack to display clothing, or a virtual shelf). Enhancing the augmented reality experience for a viewer of an online store (e.g., a visiting buyer or the seller), the GIPS 124 allows for the addition of a virtual sale indicator, allowing a seller to draw attention from viewers of the online store toward a specific item. The GIPS 124 allows a viewer to select a displayed item (e.g., by touching an item on a virtual shelf or clothing rack displayed on the user interface of the mobile device) and upon selecting the item the GIPS 124 links the viewer to a page displaying detailed information regarding the item.

Figure 5:
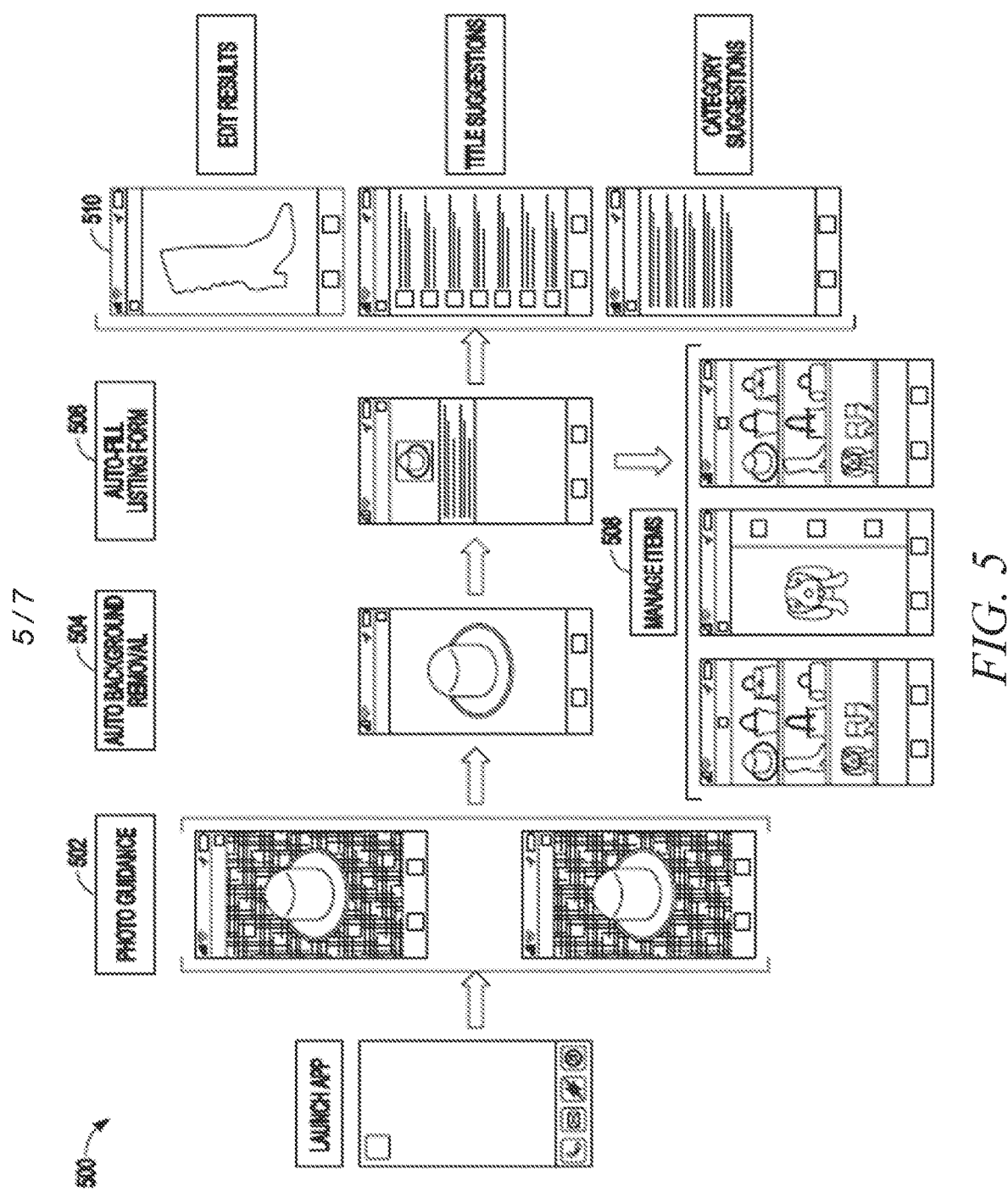
FIG. 5 is a diagram illustrating a method for automatic-guided capturing presentation of images, according to some example embodiments.

FIG. 5 is a diagram illustrating a method of automatic guided capturing presentation of images, according to some example embodiments. In 502, the GIPS 124 assists a user of a mobile device in capturing an image of an item for an item listing. As shown in FIG. 5, the GIPS 124 guides the user in positioning the mobile device in an optimal direction from the item. The GIPS 124 estimates a background portion of the image and a foreground portion of the image for each captured image frame, for example, by identifying a first region and a second region and determining that at least one area within the first region comprises a grouping of pixels that are different (e.g., different in color) from a grouping of pixels in the second region, or vice versa. The GIPS 124 estimates that the first region or second region comprises the item of interest. As shown in FIG. 5, for example, the GIPS 124 indicates the estimated first and second regions of the image to the user by displaying an outline of the item of interest. Additionally, the GIPS 124 communicates instructions to the user of the mobile device for capturing an image of the item. As the user holds the mobile device, the GIPS 124 displays instructions upon the user interface instructing the user to move the mobile device such that the item will become completely included within a boundary of the viewfinder, to increase or decrease lighting or to relocate objects. When the GIPS 124 detects that the item is completely included within the boundary of the viewfinder, an image is captured.

In 504, the GIPS 124 automatically removes the image background. As shown in FIG. 5, the GIPS 124 leaves only the portion of the image comprising the item of interest and displays a viewfinder showing the boundaries of the item of interest, which may have been used during guided image capturing. The GIPS 124 makes an initial guess of a binary mask and detects a boundary of the item within the image, separating the item from the image background. The GIPS 124 computes a color histogram a probability map, computing a probability per pixel using the color histogram. The GIPS 124 smooths the probability map by using domain transform geodesic filtering. In producing the image in 504, the GIPS 124 may also perform manual mask editing, receiving a user input in the form of a scribble and further defining the outline of the item of interest and further separating the background portion of the image from the item of interest.

In 506, the GIPS 124 generates an item listing using inferred image information. The GIPS 124 automatically fills an item listing form to create an item listing, inferring information from an image of an item (e.g., characteristics of an item including color, style, category, brand name). The GIPS 124 infers information regarding the item from the image or image frames captured during the guided image capturing described above with respect to operation 202. As shown in 510 of FIG. 5, the GIPS 124 also includes displaying a suggested title or category to the user or a list of items that potentially have similar title and/or price, assisting the user in constructing the title of the item listing and the price of the item. The GIPS 124 completes the item listing form, creating the item listing, including the image of the item, information inferred from the image regarding the item, and any additional information received from the user of the mobile device. The GIPS 124 uses a completed item listing to display the item within an augmented reality environment of a seller's online store. In 508, the GIPS 124 presents the item listing in an augmented reality environment. As shown in FIG. 5, the GIPS 124 showcases items in an augmented reality environment including a presentation layer, for example, presenting the items on a virtual shelf to be viewed by potential buyers visiting the user's online store.

Figure 6:
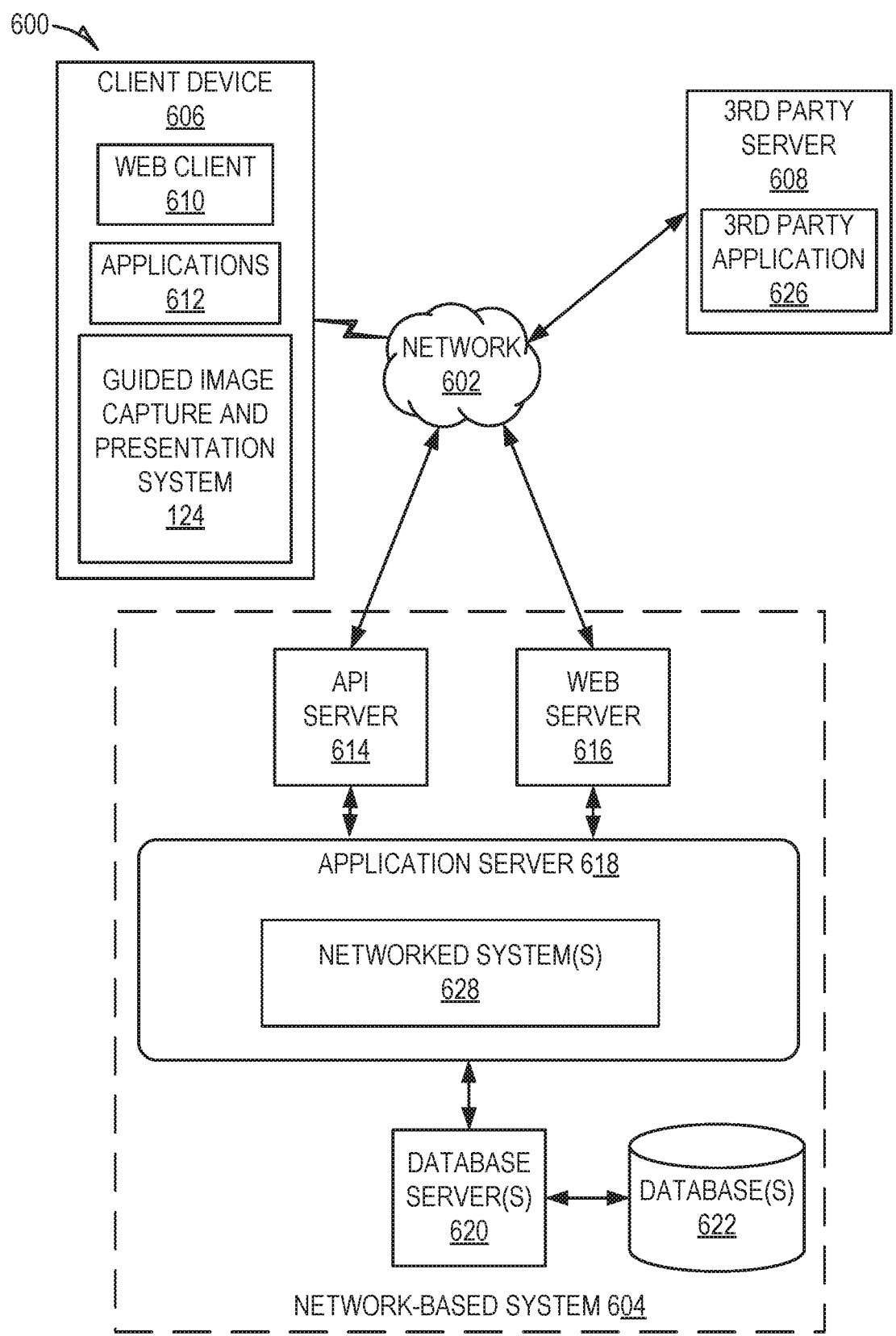
FIG. 6 is a network diagram illustrating a network environment suitable for facilitating automatic-guided image capturing and presentation, according to some example embodiments.

FIG. 6 is a network diagram illustrating a network system 600 suitable for facilitating automatic guided capturing and presentation of images, according to one embodiment, having a client-server architecture configured for exchanging data over a network 602. While the network system 600 is depicted as having a client-server architecture, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 6. Moreover, it shall be appreciated that although the various functional components of the network system 600 are discussed in the singular sense, multiple instances of any one of the various functional components may be employed.

The network system 600 includes a network-based content publisher 604 in communication with a client device 606 and a third party server 608. In some example embodiments, the network-based content publisher 604 may be a network-based marketplace (e.g., eBay.com). The network-based content publisher 604 communicates and exchanges data within the network system 600 that pertain to various functions and aspects associated with the network system 600 and its users. The network-based content publisher 604 may provide server-side functionality, via a network 602 (e.g., the Internet), to network devices such as the client device 606.

The client device 606 may be operated by users who use the network system 600 to exchange data over the network 602. These data exchanges include transmitting, receiving (communicating), and processing data to, from, and regarding content and users of the network system 600. The data may include, but are not limited to, images; video or audio content; user preferences; product and service feedback, advice, and reviews; product, service, manufacturer, and vendor recommendations and identifiers; product and service listings associated with buyers and sellers; product and service advertisements; auction bids; transaction data; user profile data; and social data, among other things.

The client device 606 may interface with the network-based content publisher 104 via a connection with the network 602. Depending on the form of the client device 606, any of a variety of types of connections and networks 602 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks). When such technology is employed, the network 602 may include a cellular network that has a plurality of cell sites of overlapping geographic coverage, interconnected by cellular telephone exchanges. These cellular telephone exchanges may be coupled to a network backbone (e.g., the public switched telephone network (PSTN), a packet-switched data network, or other types of networks).

In another example, the connection to the network 602 may be a Wireless Fidelity (Wi-Fi, IEEE 802.11x type) connection, a Worldwide Interoperability for Microwave Access (WiMAX) connection, or another type of wireless data connection. In such an embodiment, the network 602 may include one or more wireless access points coupled to a local area network (LAN), a wide area network (WAN), the Internet, or another packet-switched data network. In yet another example, the connection to the network 602 may be a wired connection (e.g., an Ethernet link), and the network 602 may be a LAN, a WAN, the Internet, or another packet-switched data network. Accordingly, a variety of different configurations are expressly contemplated.

In various embodiments, the data exchanged within the network system 600 may be dependent upon user-selected functions available through one or more client or user interfaces (UIs). The UIs may be associated with a client device, such as the client device 606 executing a web client 610 (e.g., an Internet browser), which may be in communication with the network-based content publisher 604. The UIs may also be associated with one or more applications 612 executing on the client device 606, such as a mobile application designed for interacting with the network-based content publisher 604 or with a social network platform hosted by the third party server 608.

Turning specifically to the network-based content publisher 604, an API server 614 and a web server 616 are coupled to, and provide programmatic and web interfaces respectively to, an application server 618. As illustrated in FIG. 6, the application server 618 may be coupled via the API server 614 and the web server 616 to the network 602, for example, via wired or wireless interfaces. The application server 618 is, in turn, shown to be coupled to a database server 620 that facilitates access to a database 622. In some examples, the application server 618 can access the database 622 directly without the need for the database server 620. The database 622 may include multiple databases that may be internal or external to the network-based content publisher 604.

The application server 618 may, for example, host one or more applications, which provide a number of content publishing and viewing functions and services to users who access the network-based content publisher 604. For example, the network-based content publisher 604 may host a marketplace application that provides a number of marketplace functions and services to users, such as publishing, listing, and price-setting mechanisms whereby a seller may list (or publish information concerning) goods or services (also collectively referred to as "products") for sale, a buyer can express interest in or indicate a desire to purchase such goods or services, and a price can be set for a transaction pertaining to the goods or services. The client device 606 (e.g., mobile device) hosts the GIPS 124 that performs automatic guided capturing and presentation of images.

The messages generated and published by the GIPS 124 may also include a reference to content (e.g., a link). As used herein, the terms "content" or "content item" refer to electronic data that is consumed by viewers (e.g., users) on displays, client devices, or page/display-based media (e.g., World-Wide Web (WWW) media embodied in browsers and accessible over the Internet). As such, the terms "content" and "content item" may refer to data associated with readable text, data associated with images, data associate with graphics or video, programmatic content, scripts, or data corresponding to various combinations of these. Further, while the GIPS 124 is shown in FIG. 6 to form part of the client device 606, it will be appreciated that, in alternative embodiments, the GIPS 124 may form part of a service that is separate and distinct from the client device 606. For example, in some embodiments, the GIPS 124 may be hosted in whole or in part by the application server 618.

The database 622 stores data pertaining to various functions and aspects associated with the network system 600 and its users. For example, the database 622 stores and maintains user profiles for users of the network-based content publisher 604. Each user profile comprises user profile data that describes aspects of a particular user. The user profile data may, for example, include demographic data, user preferences, social data, and financial information. The demographic data may, for example, include information describing one or more characteristics of a user such as gender, age, location information (e.g., hometown or current location), employment history, education history, contact information, familial relations, or user interests. The financial information may, for example, include private financial information of the user such as account number, credential, password, device identifier, user name, phone number, credit card information, bank information, transaction history, or other financial information which may be used to facilitate online transactions by the user.

The database 622 also stores a record of user activity. Accordingly, the network-based content publisher 604 may monitor, track, and record activities of users utilizing one or more devices (e.g., the client device 606) to interact with the various components of the network system 600 during a user session. Each user session may be maintained in a repository stored in the database 622. Accordingly, the user activity data may include past keyword searches that users have performed, web pages viewed by each user, products added to a user wish list or watch list, products added to an electronic shopping cart, and products that the users own. Consistent with some embodiments, the record of user activity is linked to user profile data so as to maintain an association of a user profile with the activities that the corresponding user has performed.

In instances in which the network-based content publisher 104 is a network-based marketplace, the database 122 stores product information. Such product information may, for example, include a product identifier (e.g., a title or a model number), a price, a make, a manufacturer, a model, a brand name, a textual description, a size, a style, product dimensions, compatibility information, or any other information that may be used to describe a product. In these instances, the database 622 may also store a transaction history of users of the network-based content publisher 604 that includes information related to transactions for products that may be offered for sale by merchants who utilize marketplace services provided by the network-based content publisher 604. The transaction history information may, for example, include a description of a product offered for sale, sold, or purchased by users, an identifier of the product, a category to which the product belongs, a purchase price, a purchase date, a purchased quantity, a number of bids for the product, or various combinations thereof.

FIG. 6 also illustrates a third party application 626 executing on the third party server 608 that may offer information or services to the application server 618 or to users of the client device 606. The third party application 626 has programmatic access to the network-based content publisher 604 via a programmatic interface provided by the API server 614. The third party application 626 is associated with any organization that may conduct transactions with or provide services to the application server 618 or to users of the client device 606. For example, the third party application 626 may be associated with a network based social network platform (e.g., Facebook®, Twitter®, Google+®, Pinterest®, LinkedIn®, or the like) that may provide a platform for members to build and maintain social networks and relations among members.

Figure 7:
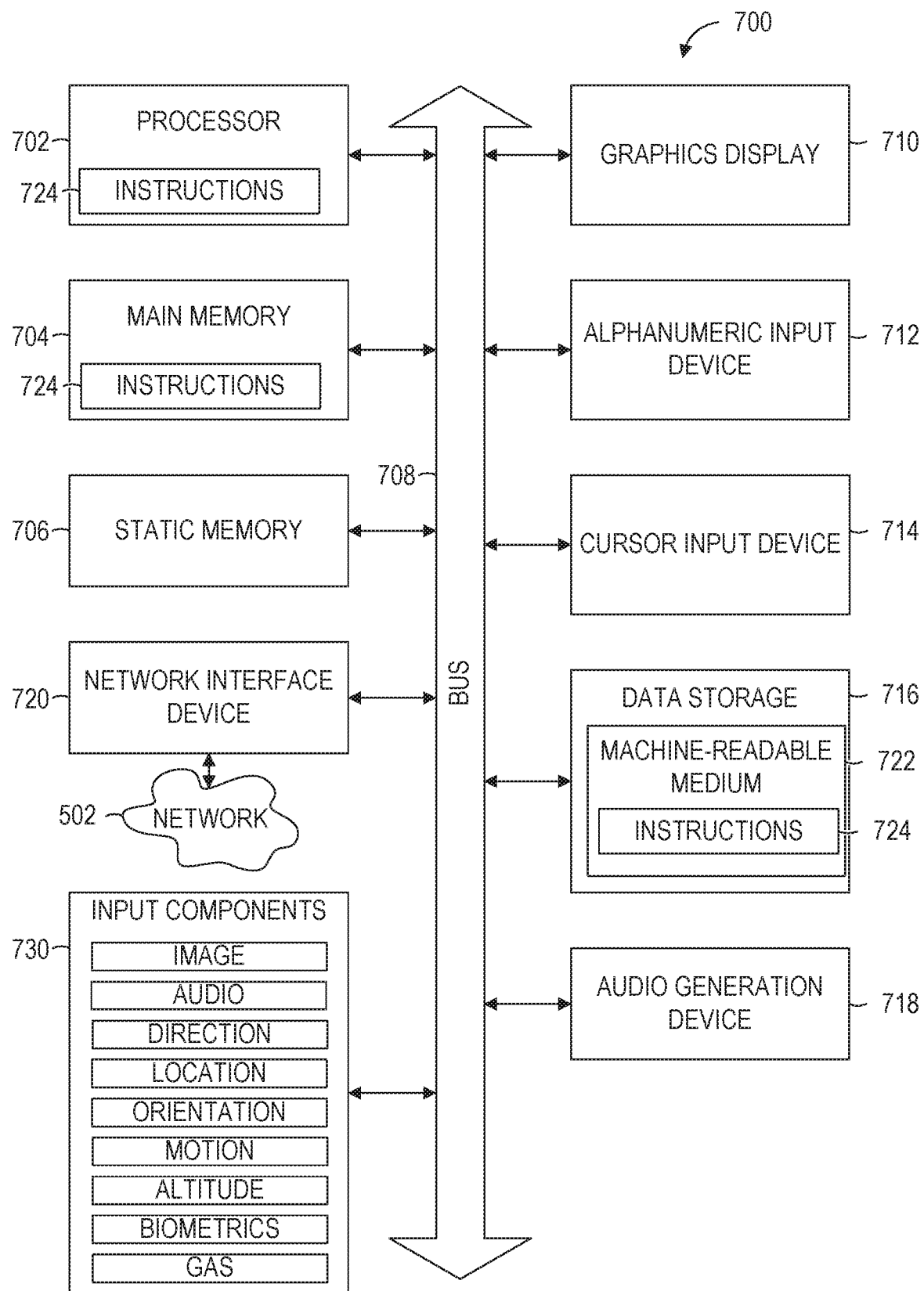
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine 700 is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 contains solid-state digital microcircuits (e.g., electronic, optical, or both) that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein. In some example embodiments, the processor 702 is a multicore CPU (e.g., a dual-core CPU, a quad-core CPU, or a 128-core CPU) within which each of multiple cores behaves as a separate processor that is able to perform any one or more of the methodologies discussed herein, in whole or in part. Although the beneficial effects described herein may be provided by the machine 700 with at least the processor 702, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor input device 714 (e.g., a mouse, a touchpad, a trackball, a joystick, a motion sensor, an eye tracking device, or other pointing instrument), a data storage 716, an audio generation device 718 (e.g., a sound card, an amplifier, a speaker, a headphone jack, or any suitable combination thereof), and a network interface device 720.

The data storage 716 (e.g., a data storage device) includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., hypertext transfer protocol (HTTP)).

In some example embodiments, the machine 700 may be a portable computing device (e.g., a smart phone, tablet computer, or a wearable device), and have one or more additional input components 730 (e.g., sensors or gauges). Examples of such input components 730 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a biometric input component (e.g., a heartrate detector or a blood pressure detector), and a gas detection component (e.g., a gas sensor). Input data gathered by any one or more of these input components 730 may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof. A "non-transitory" machine-readable medium, as used herein, specifically does not include propagating signals per se. In some example embodiments, the instructions 724 for execution by the machine 700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 724).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following describes various examples of methods, machine-readable media, and systems (e.g., machines, devices, or other apparatus) discussed herein.

Examples

A first example provides a method comprising capturing an image of an item, including guiding the user to position a mobile device in a direction from the item such that the item is included within the boundary of an area of a user interface of the mobile device, detecting the item through a camera of the mobile device and capturing at least one image frame of the item, estimating a boundary of a first region and a boundary of a second region of the at least one image frame, determining that the first region comprises a larger portion of the item than the second region, displaying instructions on the user interface of the mobile device instructing the user to take an action such that the item will become completely included and visible within the boundary of the first region, and detecting that the item is completely included and visible within the boundary of the first region.

A second example provides a method according to the first example further comprising automatically removing a background of the image frame, including accessing the image frame of the item, detecting a boundary of the item within the first region, the boundary of the item following an outline of the item on the user interface, an inner portion of the boundary comprising only the item and an outer portion of the boundary comprising the background of the image frame, differentiating the inner portion of the boundary from the outer portion of the boundary, estimating a first binary mask, the first binary mask comprising the inner portion of the boundary and the outer portion of the boundary of the image frame, computing a color histogram of the image frame, including the inner portion of the boundary and the outer portion of the boundary, computing a probability map of the image frame, including the inner portion of the boundary and the outer portion of the boundary, and smoothing the probability map, including the inner portion of the boundary and the outer portion of the boundary.

A third example provides a method according to the second example further comprising obtaining a second binary mask, assigning a first binary value to each pixel of a first plurality of pixels within the image frame having an RGB value above a determined threshold value and assigning a second binary value to each pixel of a second plurality of pixels within the image frame having an RGB value below the determined threshold value, and obtaining a first background-free item image, applying the second binary mask to the image frame.

A fourth example provides a method according to the first example further comprising performing manual mask editing, including accessing the probability map, receiving a user input from the mobile device, the user input including a scribble, smoothing the scribble, and scaling the scribble, including assigning the first binary value to each pixel of a third plurality of pixels comprising the scribble having an RGB value above the determined threshold value and assigning the second binary value to each pixel having an RGB value below the determined threshold value.

A fifth example provides a method according to the first example further comprising obtaining a third binary mask, including differentiating the scaled scribble from the probability map, adding or subtracting the binary values of the pixels comprising the scaled scribble from the probability map, and obtaining a second background-free item image, applying the third binary mask to the first background-free item image.

A sixth example provides a method according to the first example further comprising generating an item listing, inferring item information from the image frame and automatically applying the inferred item information to an item listing form.

A seventh example provides a method according to the first example further comprising presenting an item listing in an augmented reality environment, including displaying the item from the image frame in a presentation layer on a user interface of a mobile device.

An eighth example provides a system comprising one or more processors and executable instructions accessible on a computer-readable medium that, when executed, cause the one or more processors to perform operations comprising capturing an image of an item, including guiding the user to position a mobile device in a direction from the item such that the item is included within the boundary of an area of a user interface of the mobile device, detecting the item through a camera of the mobile device and capturing at least one image frame of the item, estimating a boundary of a first region and a boundary of a second region of the at least one image frame, determining that the first region comprises a larger portion of the item than the second region, displaying instructions on the user interface of the mobile device instructing the user to take an action such that the item will become completely included and visible within the boundary of the first region, and detecting that the item is completely included and visible within the boundary of the first region.

A ninth example provides a system according to the eighth example, wherein the operations further comprise automatically removing a background of the image frame, including accessing the image frame of the item detecting a boundary of the item within the first region, the boundary of the item following an outline of the item on the user interface, an inner portion of the boundary comprising only the item and an outer portion of the boundary comprising the background of the image frame, differentiating the inner portion of the boundary from the outer portion of the boundary, estimating a first binary mask, the first binary mask comprising the inner portion of the boundary and the outer portion of the boundary of the image frame, computing a color histogram of the image frame, including the inner portion of the boundary and the outer portion of the boundary, computing a probability map of the image frame, including the inner portion of the boundary and the outer portion of the boundary, and smoothing the probability map, including the inner portion of the boundary and the outer portion of the boundary.

A tenth example provides a system according to the ninth example, wherein the operations further comprise obtaining a second binary mask, assigning a first binary value to each pixel of a first plurality of pixels within the image frame having an RGB value above a determined threshold value and assigning a second binary value to each pixel of a second plurality of pixels within the image frame having an RGB value below the determined threshold value, and obtaining a first background-free item image, applying the second binary mask to the image frame.

An eleventh example provides a system according to the eighth example, wherein the operations further comprise performing manual mask editing, including accessing the probability map, receiving a user input from the mobile device, the user input including a scribble, smoothing the scribble, and scaling the scribble, including assigning the first binary value to each pixel of a third plurality of pixels comprising the scribble having an RGB value above the determined threshold value and assigning the second binary value to each pixel having an RGB value below the determined threshold value.

A twelfth example provides a system according to the eleventh example, wherein the operations further comprise obtaining a third binary mask, including differentiating the scaled scribble from the probability map, adding or subtracting the binary values of the pixels comprising the scaled scribble from the probability map, and obtaining a second background-free item image, applying the third binary mask to the first background-free item image.

A thirteenth example provides a system according to the eighth example, wherein the operations further comprise generating an item listing, inferring item information from the image frame and automatically applying the inferred item information to an item listing form.

A fourteenth example provides a system according to the eighth example, wherein the operations further comprise presenting an item listing in an augmented reality environment, including displaying the item from the image frame in a presentation layer on a user interface of a mobile device.

A fifteenth example provides a computer-readable hardware storage device having stored therein a set of program instructions which, when executed by the computer causes the computer to perform operations comprising capturing an image of an item, including guiding the user to position a mobile device in a direction from the item such that the item is included within the boundary of an area of a user interface of the mobile device, detecting the item through a camera of the mobile device and capturing at least one image frame of the item, estimating a boundary of a first region and a boundary of a second region of the at least one image frame, determining that the first region comprises a larger portion of the item than the second region, displaying instructions on the user interface of the mobile device instructing the user to take an action such that the item will become completely included and visible within the boundary of the first region, and detecting that the item is completely included and visible within the boundary of the first region.

A sixteenth example provides a computer-readable hardware storage device according to the fifteenth example, further comprising automatically removing a background of the image frame, including accessing the image frame of the item, detecting a boundary of the item within the first region, the boundary of the item following an outline of the item on the user interface, an inner portion of the boundary comprising only the item and an outer portion of the boundary comprising the background of the image frame, differentiating the inner portion of the boundary from the outer portion of the boundary, estimating a first binary mask, the first binary mask comprising the inner portion of the boundary and the outer portion of the boundary of the image frame, computing a color histogram of the image frame, including the inner portion of the boundary and the outer portion of the boundary, computing a probability map of the image frame, including the inner portion of the boundary and the outer portion of the boundary, and smoothing the probability map, including the inner portion of the boundary and the outer portion of the boundary.

A seventeenth example provides a computer-readable hardware storage device according to the sixteenth example, further comprising obtaining a second binary mask, assigning a first binary value to each pixel of a first plurality of pixels within the image frame having an RGB value above a determined threshold value and assigning a second binary value to each pixel of a second plurality of pixels within the image frame having an RGB value below the determined threshold value, and obtaining a first background-free item image, applying the second binary mask to the image frame.

An eighteenth example provides a computer-readable hardware storage device according to the fifteenth example, further comprising performing manual mask editing, including accessing the probability map, receiving a user input from the mobile device, the user input including a scribble, smoothing the scribble, and scaling the scribble, including assigning the first binary value to each pixel of a third plurality of pixels comprising the scribble having an RGB value above the determined threshold value and assigning the second binary value to each pixel having an RGB value below the determined threshold value.

A nineteenth example provides a computer-readable hardware storage device according to the eighteenth example, further comprising obtaining a third binary mask, including differentiating the scaled scribble from the probability map, adding or subtracting the binary values of the pixels comprising the scaled scribble from the probability map, and obtaining a second background-free item image, applying the third binary mask to the first background-free item image.

A twentieth example provides a computer-readable hardware storage device according to the fifteenth example, further comprising generating an item listing, inferring item information from the image frame and automatically applying the inferred item information to an item listing form.

What is claimed is:

1. A method, comprising:
   capturing a first image representing an item;
   classifying a portion of pixels in the first image as background pixels;
   modifying the first image based on the classification to generate a second image representing the item;
   causing display of the second image on an electronic display;
   receiving data defining a scribble on the displayed second image;
   smoothing the scribble using domain transform geodesic filtering and scaling the scribble by performing binary quantization of the scribble;
   classifying a second portion of pixels in the second image as background pixels based on the smoothed and scaled scribble;
   modifying the second image based on the classification to generate a third image representing the item; and
   causing display of the third image on the electronic display.

2. The method of claim 1, wherein classifying the portion of pixels in the first image as background pixels comprises determining a probability for each pixel in the portion of pixels of whether the respective pixel is part of a background of the first image.

3. The method of claim 2, further comprising determining a color histogram for the first image, wherein the determining of the probabilities is based on the color histogram.

4. The method of claim 1, further comprising causing display of guidance to position the mobile device in a direction from the item such that the item is included within a bounded area of a user interface of the mobile device.

5. The method of claim 1, further comprising: classifying the item as represented by the third image; and
   generating an item listing for the item based on the classification.

6. The method of claim 1, wherein causing display of the second image comprises causing display of a binary mask of the second image, and the receiving of the data defining the scribble comprises receiving input defining one or more changes to the binary mask.

7. The method of claim 1, wherein classifying a portion of pixels in the first image as background pixels comprises generating a binary mask of the first image, smoothing and scaling the binary mask, wherein the modification of the first image is based on the smoothed and scaled binary mask.

8. A system, comprising:
   hardware processing circuitry;
   one or more hardware memories storing instructions that when executed configure the hardware processing circuitry to perform operations comprising:
   capturing a first image representing an item;
   classifying a portion of pixels in the first image as background pixels;
   modifying the first image based on the classification to generate a second image representing the item;
   causing display of the second image on an electronic display;
   receiving data defining a scribble on the displayed second image;
   smoothing the scribble using domain transform geodesic filtering and scaling the scribble by performing binary quantization of the scribble;
   classifying a second portion of pixels in the second image as background pixels based on the smoothed and scaled scribble;
   modifying the second image based on the classification to generate a third image representing the item; and
   causing display of the third image on the electronic display.

9. The system of claim 8, wherein classifying the portion of pixels in the first image as background pixels comprises determining a probability for each pixel in the portion of pixels of whether the respective pixel is part of a background of the first image.

10. The system of claim 9, the operations further comprising determining a color histogram for the first image, wherein the determining of the probabilities is based on the color histogram.

11. The system of claim 8, the operations further comprising causing display of guidance to position the mobile device in a direction from the item such that the item is included within a bounded area of a user interface of the mobile device.

12. The system of claim 8, further comprising:
classifying the item as represented by the third image; and
generating an item listing for the item based on the classification.

13. The system of claim 8, wherein causing the display of the second image comprises causing display of a binary mask of the second image, and the receiving of the data defining the scribble comprises receiving input defining one or more changes to the binary mask.

14. The system of claim 8, wherein classifying a portion of pixels in the first image as background pixels comprises generating a binary mask of the first image, smoothing and scaling the binary mask, wherein the modification of the first image is based on the smoothed and scaled binary mask.

15. A non-transitory computer readable storage medium comprising instructions that when executed configure hardware processing circuitry to perform operations comprising:
capturing a first image representing an item;
classifying a portion of pixels in the first image as background pixels; modifying the first image based on the classification to generate a second image representing the item;
causing display of the second image on an electronic display;
receiving data defining a scribble on the displayed second image;
smoothing the scribble using domain transform geodesic filtering and scaling the scribble by performing binary quantization of the scribble;
classifying a second portion of pixels in the second image as background pixels based on the smoothed and scaled scribble;
modifying the second image based on the classification to generate a third image representing the item; and
causing display of the third image on the electronic display.

16. The non-transitory computer readable storage medium of claim 15, wherein causing display of the second image comprises causing display of a binary mask of the second image, and the receiving of the data defining the scribble comprises receiving input defining one or more changes to the binary mask.

17. The non-transitory computer readable storage medium of claim 15,
wherein classifying a portion of pixels in the first image as background pixels comprises generating a binary mask of the first image, smoothing and scaling the binary mask, wherein the modification of the first image is based on the smoothed and scaled binary mask.

* * * * *